US009092777B1

(12) United States Patent
Gaspar (10) Patent No.: US 9,092,777 B1
(45) Date of Patent: Jul. 28, 2015

(54) CREDIT CARD TOKENIZATION TECHNIQUES

(71) Applicant: YapStone, Inc., Walnut Creek, CA (US)

(72) Inventor: Don Gaspar, Los Gatos, CA (US)

(73) Assignee: YapStone, Inc., Walnut Creek, CA (US)

( * ) Notice: Subject to any disclaimer, the term of this patent is extended or adjusted under 35 U.S.C. 154(b) by 421 days.

(21) Appl. No.: 13/683,917

(22) Filed: Nov. 21, 2012

(51) Int. Cl.
*G06Q 99/00* (2006.01)
*G06Q 20/38* (2012.01)
G06Q 20/06 (2012.01)
G06Q 20/00 (2012.01)

(52) U.S. Cl.
CPC ............... *G06Q 20/38* (2013.01); *G06Q 20/00* (2013.01); *G06Q 20/06* (2013.01); *G06Q 20/385* (2013.01)

(58) Field of Classification Search
CPC ...... G06Q 20/00; G06Q 20/06; G06Q 20/385
USPC ................................................ 705/64, 76, 79
See application file for complete search history.

(56) References Cited

U.S. PATENT DOCUMENTS

| | | | |
|---|---|---|---|
| 6,988,657 B1 * | 1/2006 | Singer et al. .................. 235/380 |
| 7,761,380 B2 * | 7/2010 | Katz ............................... 705/44 |
| 8,112,353 B2 * | 2/2012 | Li et al. ........................... 705/39 |
| 8,549,279 B1 * | 10/2013 | Sahasranaman et al. ..... 713/150 |
| 8,655,787 B1 * | 2/2014 | Griffin et al. ................... 705/64 |
| 8,682,802 B1 * | 3/2014 | Kannanari ....................... 705/65 |
| 2002/0002538 A1 * | 1/2002 | Ling ................................ 705/41 |
| 2005/0097060 A1 * | 5/2005 | Lee et al. ........................ 705/65 |
| 2006/0085335 A1 | 4/2006 | Crawford et al. |
| 2008/0103923 A1 * | 5/2008 | Rieck et al. ..................... 705/26 |
| 2008/0283591 A1 * | 11/2008 | Oder et al. ..................... 235/380 |
| 2009/0240620 A1 * | 9/2009 | Kendrick et al. ............... 705/39 |
| 2009/0294527 A1 * | 12/2009 | Brabson et al. ............... 235/380 |
| 2010/0030697 A1 * | 2/2010 | Goodrich et al. ............... 705/75 |
| 2010/0094755 A1 * | 4/2010 | Kloster ............................ 705/44 |
| 2010/0257612 A1 * | 10/2010 | McGuire et al. ................ 726/26 |
| 2011/0161233 A1 * | 6/2011 | Tieken ............................. 705/71 |

(Continued)

FOREIGN PATENT DOCUMENTS

WO  WO2010/126509 A2 * 11/2010

OTHER PUBLICATIONS

U.S. Appl. No. 13/899,235, filed May 21, 2013, Gaspar et al.

(Continued)

*Primary Examiner* — James D Nigh
(74) *Attorney, Agent, or Firm* — Mauriel Kapouytian Woods LLP; James Woods (57) ABSTRACT

The present invention provides techniques in connection with payment transactions. Techniques are included in which a non-merchant entity generates, stores, and provides to a merchant a token that can be stored and used by the merchant, for example, in place of a credit card number, in connection with a desired payment transaction. The token may be randomized, including alphanumeric characters, be of equal length to the credit card number, and include a configurable character sequence that is identical to a sequence of numbers in the credit card number. Additionally, the token may have a configurable maximum amount of time between generation and expiry, and may be useable in connection with only a single desired payment transaction. Storage and use of a token, instead of a credit card number, by the merchant in connection with the payment transaction may prevent the merchant from being subject to Payment Card Industry Data Security Standard requirements.

20 Claims, 7 Drawing Sheets

(56) References Cited

U.S. PATENT DOCUMENTS

| | | | |
|---|---|---|---|
| 2011/0208659 A1* | 8/2011 | Easterly et al. | 705/79 |
| 2011/0251892 A1* | 10/2011 | Laracey | 705/14.51 |
| 2011/0307710 A1* | 12/2011 | McGuire et al. | 713/183 |
| 2011/0320344 A1* | 12/2011 | Faith et al. | 705/39 |
| 2012/0005038 A1* | 1/2012 | Soman | 705/26.41 |
| 2012/0041881 A1* | 2/2012 | Basu et al. | 705/67 |
| 2012/0078782 A1* | 3/2012 | Schoenberg et al. | 705/40 |
| 2012/0101882 A1 | 4/2012 | Todd | |
| 2012/0203700 A1* | 8/2012 | Ornce et al. | 705/67 |
| 2012/0259781 A1* | 10/2012 | Fote et al. | 705/44 |
| 2012/0259782 A1* | 10/2012 | Hammad | 705/44 |
| 2012/0267432 A1* | 10/2012 | Kuttuva | 235/379 |
| 2012/0317036 A1* | 12/2012 | Bower et al. | 705/75 |
| 2013/0031006 A1* | 1/2013 | McCullagh et al. | 705/66 |
| 2013/0091061 A1* | 4/2013 | Caulkett et al. | 705/65 |
| 2013/0097081 A1* | 4/2013 | Leavitt et al. | 705/44 |
| 2013/0110658 A1* | 5/2013 | Lyman et al. | 705/18 |
| 2013/0275308 A1* | 10/2013 | Paraskeva et al. | 705/71 |
| 2014/0032419 A1* | 1/2014 | Anderson et al. | 705/78 |
| 2014/0229382 A1 | 8/2014 | Fote | |

OTHER PUBLICATIONS

U.S. Appl. No. 13/774,813, filed Feb. 22, 2013, Gaspar et al.

* cited by examiner

CREDIT CARD TOKENIZATION TECHNIQUES

BACKGROUND

Tokenization may be used in payment card, such as credit card, transactions, or other transactions. A token may be used and stored by a merchant, for example, instead of, or in place of, a credit card number for a particular transaction, or desired or attempted transaction. It may be impossible to obtain the credit card number from the token, due, for example, to the token being randomized in some way.

For example, a customer may attempt to make a purchase on a Web site of a merchant. The merchant may not wish to store, transmit, or store or transmit more than necessary, personally identifiable information (PII), such as, for example, payment card, including credit card, information or numbers, etc. For example, by eliminating or sufficiently limiting such activities, the merchant may be able to avoid laws, regulations, standards or other requirements or recommendations that may apply to entities that perform such activities or engage in such conduct. For example, the merchant may be able to avoid application of Payment Card Industry Data Security Standard (PCC DSS) requirements. Tokenization may help make this possible. Furthermore, by not storing the credit card information, hacking or theft of information from the merchant cannot include this sensitive information.

SUMMARY

Some embodiments of the invention provide systems and methods for use in connection with payment transactions. Techniques are included in which, for example, a non-merchant entity generates, stores, and provides to, for example, a merchant a token that can be stored and used by the merchant, for example, in place of a payment card number or credit card number, in connection with a desired payment transaction. The token may be randomized, including alphanumeric characters, be of equal length to the credit card number, and include a configurable character sequence that is identical to a sequence of numbers in the credit card number. Additionally, the token may have a configurable amount of time between generation and expiry, and may be useable in connection with only a single desired payment transaction or for a single use by the non-merchant entity. Storage and use of a token, instead of a payment card number, by the merchant in connection with the payment transaction may, for example, help prevent the merchant from being subject to Payment Card Industry Data Security Standard requirements.

While the invention is described with reference to the above drawings, the drawings are intended to be illustrative, and the invention contemplates other embodiments within the spirit of the invention.

DETAILED DESCRIPTION

Figure 1:
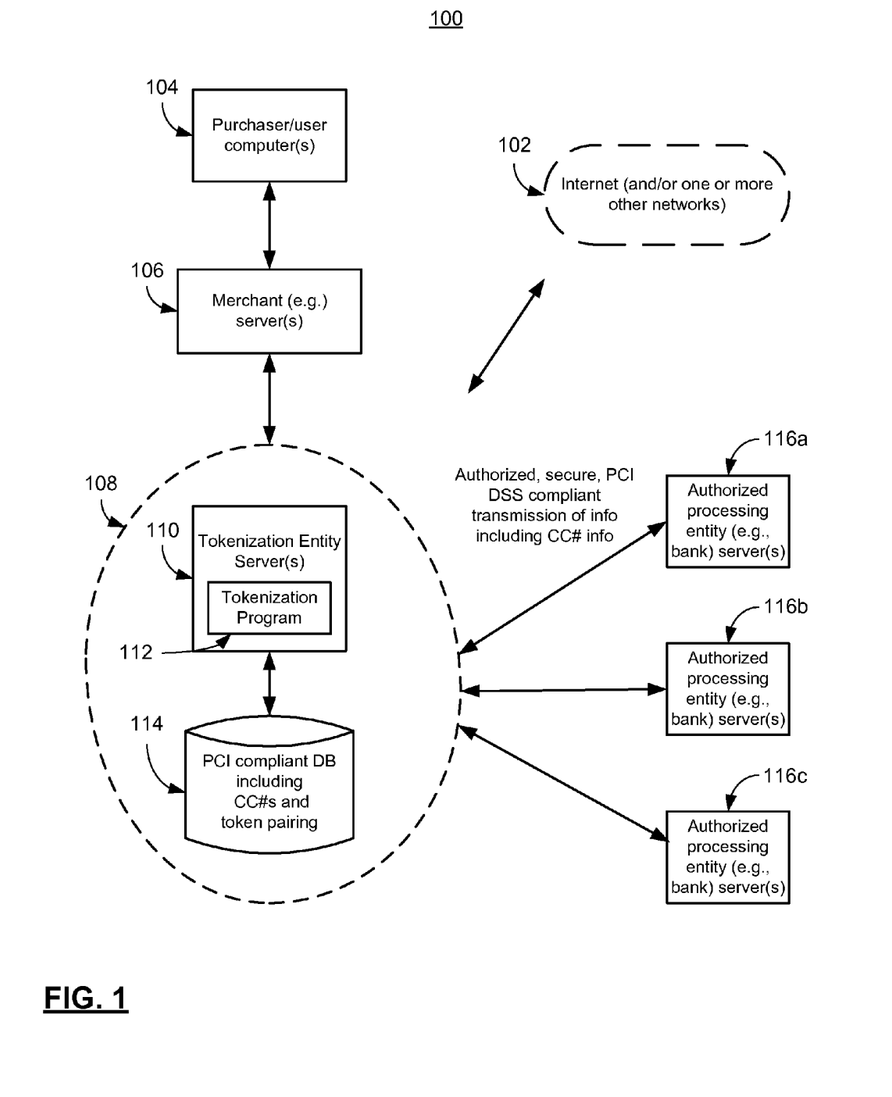
FIG. 1 is a distributed computer system according to one embodiment of the invention.

FIG. 1 is a distributed computer system 100 according to one embodiment of the invention. The system 100 includes one or more purchaser or user computers 104, one or more merchant servers 106, one or more tokenization entity servers 110, one or more Payment Card Industry Data Security Standard compliant databases 114, and one or more authorized processing entity servers 116a-116c, which computers may be connected or connectable via one or more networks 102. The one or more networks 102 may include the Internet, one or more other wired or wireless networks, WANs, PANs, telephone, cell phone, or other data networks, etc. The invention further contemplates embodiments in which server computers or other computers may be or include wireless, portable, or handheld devices such as cell phones, smart phone, PDAs, tablets, etc.

Each of the depicted computers may be distributed, and can include various hardware, software, applications, algorithms, programs and tools. Some depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable financial or ecommerce functionality, transactions, payment processing, searching, search results, content serving and advertising, such as graphical or banner content or advertising as well as keyword searching and advertising in a sponsored search context. Many types of content and advertisements are contemplated, including textual, rich advertisements media, video, coupon-related, group-related, social networking-related content or advertisements, etc.

Each of the depicted server computers includes one or more CPUs and one or more data storage devices, which may include one or more databases. The tokenization entity server 110 includes a Tokenization Program 112, which may be stored in one or more data storage devices of the server, or may be stored in one or more remote data storage devices.

The Tokenization Program 112 is intended to broadly include all programming, applications, algorithms, software, engines, modules, functions, and other tools necessary to implement or facilitate methods and systems according to embodiments of the invention. The elements of the Program 112 may exist on a single server computer or be distributed among multiple computers or devices. In some embodiments, elements of the Program 112 may exist outside of a tokenization entity server, such as by including one or more programs or applications on one or more customer or user computers, one or more merchant server computers, or one or more processing entity server computers, for example.

Broken oval 108 represents security measures taken in connection with the tokenization entity server 110 and the database 114, which may include security measures in connection with data storage, transmission or reception. For example, in some embodiments, such security measures may ensure, or be part of ensuring, compliance with Payment Card Industry Data Security Standards (PCI DDS), or requirements, laws, regulations, rules, or recommendations related thereto, including with regard to Personally Identifiable Information (PII).

Figure 2:
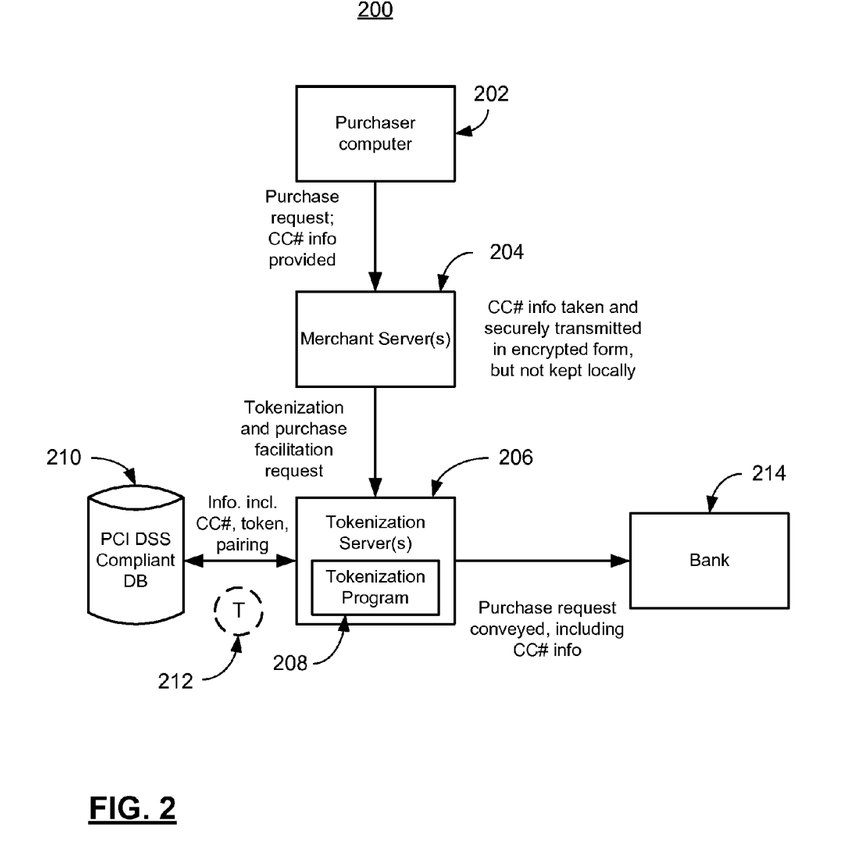
FIG. 2 is a block diagram illustrating a method according to one embodiment of the invention.

FIG. 2 is a block diagram illustrating a method 200 according to one embodiment of the invention. Block 202 represents a purchaser computer. As depicted, the purchaser makes a purchase request and provides credit card information, including the credit card number. A merchant server 204 receives the credit card information, perhaps among other information, and securely transmits it in encrypted form to a tokenization server 206, but the merchant does not store and keep the credit card information. In some embodiments, the merchant may not even receive the credit card information. For example, even if the purchaser attempts to make a purchase at the merchant's Web site, the portion of the merchant's Web site at which the customer enters information including credit card information may be administered or associated with another entity, such as a tokenization entity, such that the information is received directly by the other entity, without having been received by the merchant at all.

As depicted, the merchant server 204 makes a tokenization and purchase facilitation request, which may be explicit or implicit, which is received by the tokenization server 206, which includes a tokenization program 208. The tokenization server 206 transmits, perhaps in encrypted and/or otherwise secured form, information regarding the purchase request, and the credit card information, perhaps among other information, such as desired purchase transaction information, to a processing entity, such as, for example, a bank 214.

Additionally, the tokenization server 206 transmits including the credit card number, the token 212, such as a character sequence of or constituting the token 212, and explicit or implicit pairing information, to a Payment Card Industry Data Security Standard compliant database. Other information may also be transmitted and stored, including information about the associated requested transaction or parties thereto, token related parameters, etc.

Figure 3:
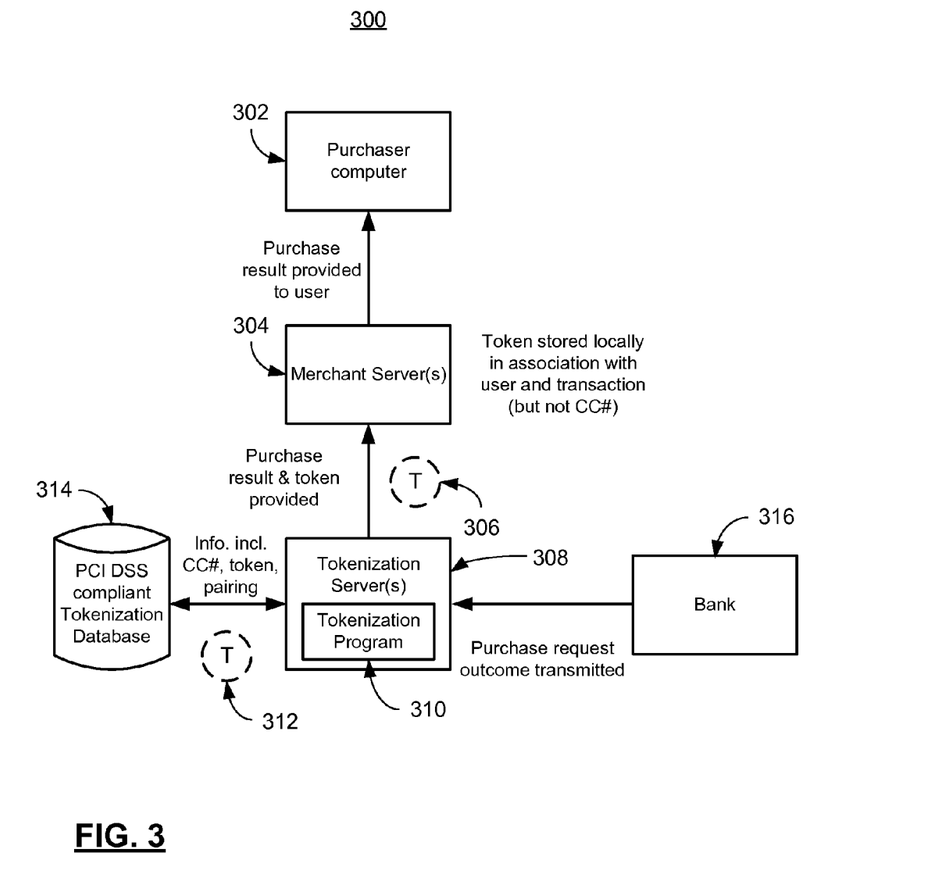
FIG. 3 is a block diagram illustrating a method according to one embodiment of the invention.

FIG. 3 is a block diagram illustrating a method 300 according to one embodiment of the invention, which may occur in conjunction with, or after, elements of the method depicted in FIG. 2. As depicted, a processing entity, such as a bank 316, for example, after having received purchase request and credit card information, perhaps among other information, may transmit purchase request outcome information to the tokenization server 308, which includes a tokenization program 310. Before doing this, the bank 316 may attempt to implement or affect the requested transaction. For example, an outcome may include authorization, or authorization and implementation, of the purchase, or denial or other non-implementation or refusal of the purchase.

After receiving outcome information from the bank 316, the tokenization server 308 may transmit purchase result and token information, which may, for example, be obtained from the database 314, to the merchant server 304, where the information, but not the actual credit card number information, may be stored locally by the merchant or on the merchant's server 304, database, or computer system.

The merchant server 304 may transmit information including outcome information regarding the requested purchase transaction, to a purchaser computer 302. The merchant may, for various purposes, refer to the requested transaction by utilizing token information or a portion of the token itself, such as, in some embodiments, four characters of the token, such as the last four characters, which may be identical to the last four numbers of the credit card used in the requested purchase transaction.

Figure 4:
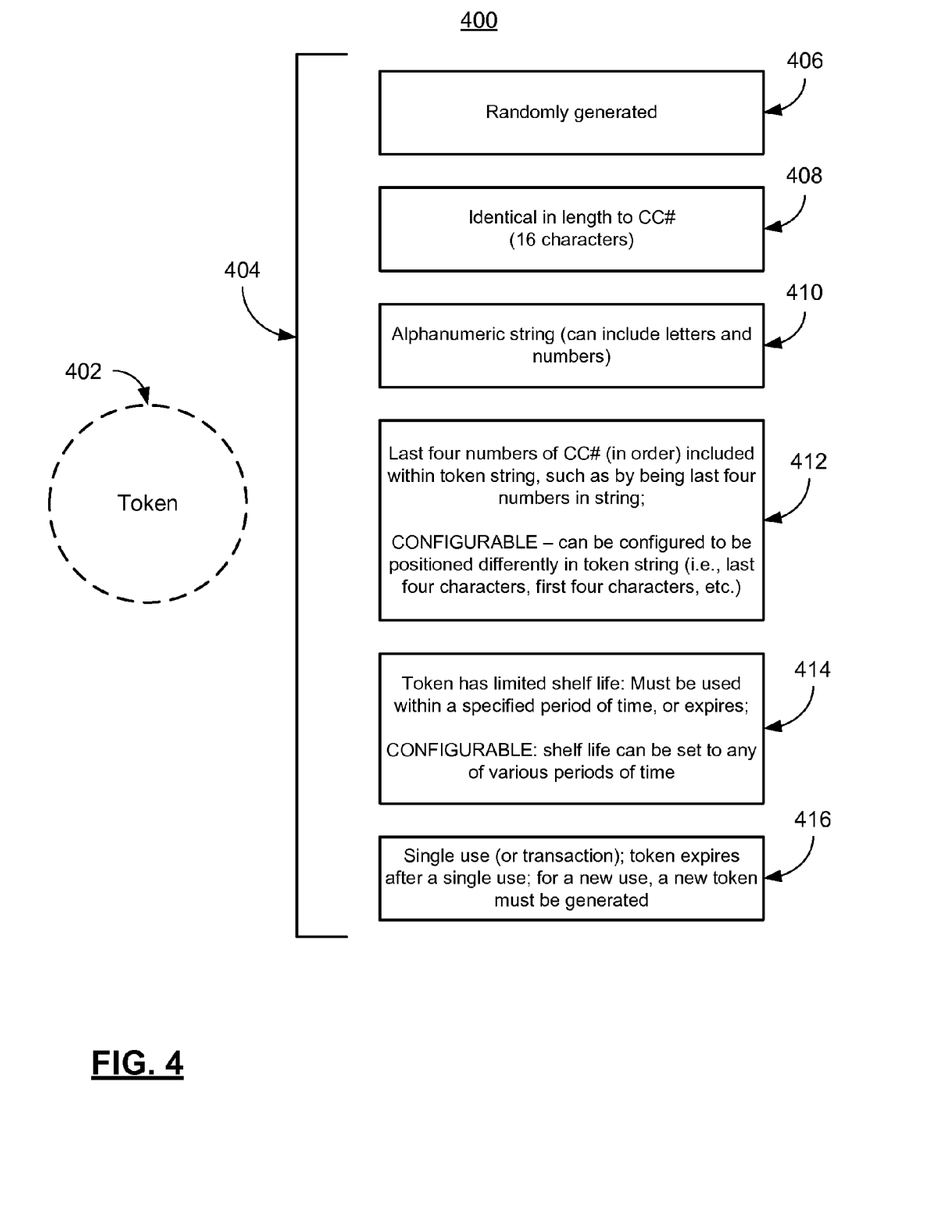
FIG. 4 is a block diagram illustrating one embodiment of the invention.

FIG. 4 is a block diagram 400 illustrating one embodiment of the invention. A token 402, according to one embodiment of the invention, is conceptually depicted. Various properties or characteristics of the token are also depicted, as represented by bracket 404.

In some embodiments, the token 402 is, in some fashion, randomly generated 406, which can include incorporation or use of any randomization or pseudorandomization element, algorithm, etc.

In some embodiments, the token 402 is identical in length, or number of characters, to an associated credit card number 408.

In some embodiments, the token 402 includes or is an alphanumeric string 410, which may include numbers and letters. In some embodiments, symbols or other characters may also be included.

In some embodiments, the last four numbers of the associated credit card number, in order, are included within token 402 string, such as by being last four numbers in string 412. In some embodiments, these characters may be configurable, such as be being able to be configured to be positioned differently in the token character sequence, i.e., the last four characters, the first four characters, the second four numbers, the third four numbers, or some other specified sequential positioning of four numbers, for example. In various embodiments, the characters or their positioning may be configurable by the merchant, a tokenization entity, or some other entity. In some embodiments, this configuration can be a parameter of the token that is configured prior to generation, and at various levels of breadth, generality, application, etc. Configuration may include preferential flagging, modification of default settings, etc.

In some embodiments, the token 402 may have a limited "shelf life", such as by being required to be used within a certain set period of time following generation 414. The token may, for example, expire at the end of such period, so that it is no longer useable. In some embodiments, the token 402 may be configurable in this regard. For example, the token may be configurable in terms of the timing or length of the period, such as by the associated merchant, a non-merchant tokenization entity, a user or customer, or some other entity. In some embodiments, this configuration can be a parameter of the token that is configured prior to generation, and at various levels of breadth, generality, application, etc. Configuration may include preferential flagging, modification of default settings, etc.

In some embodiments, the token 402 may be useable only for a single use 416, such as by a tokenization entity. In some embodiments, the token expires after a single use, and for a new use, a new token must be generated. For example, the token 402 may be generated in associated with a particular requested transaction, and may not be useable in connection with any other requested, potential, or actual transaction. In some embodiments, this configuration can be a parameter of the token that is configured prior to generation, and at various levels of breadth, generality, application, etc. Configuration may include preferential flagging, modification of default settings, etc.

Figure 5:
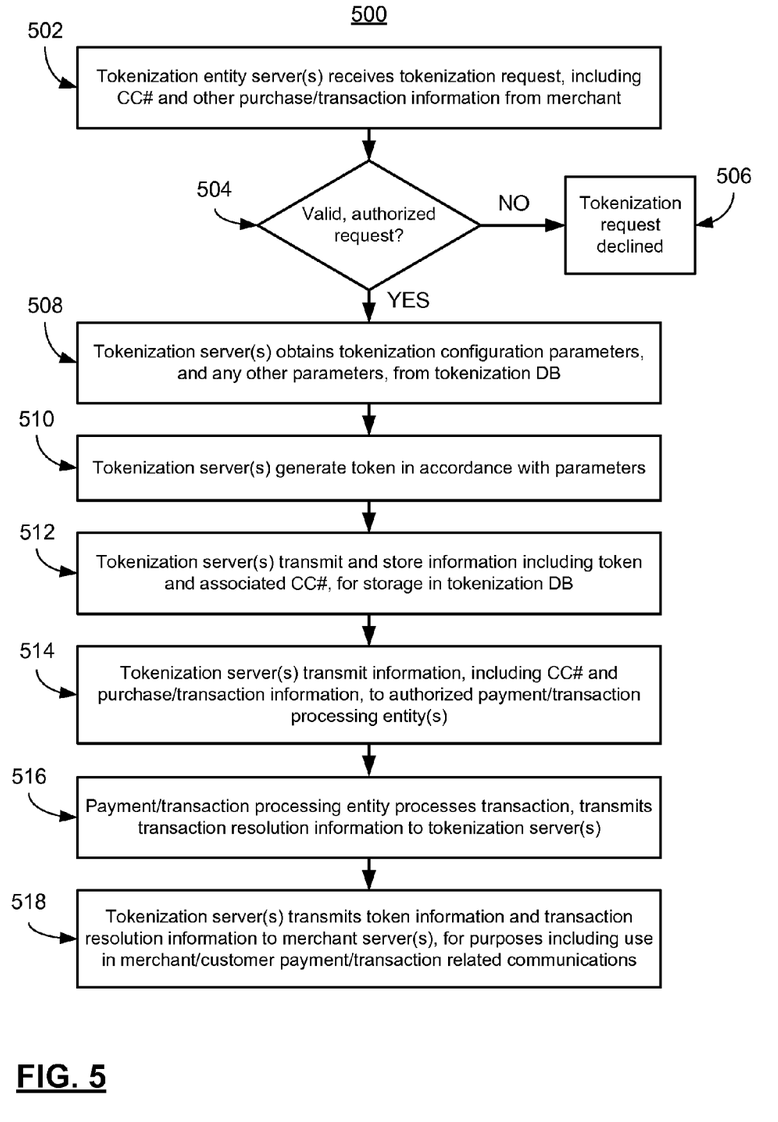
FIG. 5 is a flow diagram illustrating a method according to one embodiment of the invention.

FIG. 5 is a flow diagram 500 illustrating a method according to one embodiment of the invention. At step 502, the tokenization entity server receives a tokenization request, including credit card number information and other purchase/transaction information from a merchant.

At step 504, the method 500 queries whether the request is a valid, authorized request. If not, then the request is declined at step 506. If so, then the method 500 proceeds to step 508.

At step 508, the tokenization server obtains tokenization configuration parameters, and any other parameters, from a tokenization database.

At step 510, the tokenization server generates a token in accordance with the parameters.

At step 512, the tokenization server transmits and stores information including the token and the associated credit card number, for storage in the tokenization database.

At step 514, the tokenization server transmits information, including the credit card number and purchase/transaction information, to an authorized payment/transaction processing entity (where it may be passed on further, and back, etc.).

At step 516, the Payment/transaction processing entity processes the transaction (which can include determining whether to, or attempting to, implement the transaction, whether or not completed), and transmits transaction resolution (which can include partial resolution) information to the tokenization server.

At step 518, the tokenization server transmits token information and transaction resolution (including outcome) information to a merchant server, for purposes including, for example, use in merchant/customer payment/transaction related communications, etc.

Figure 6:
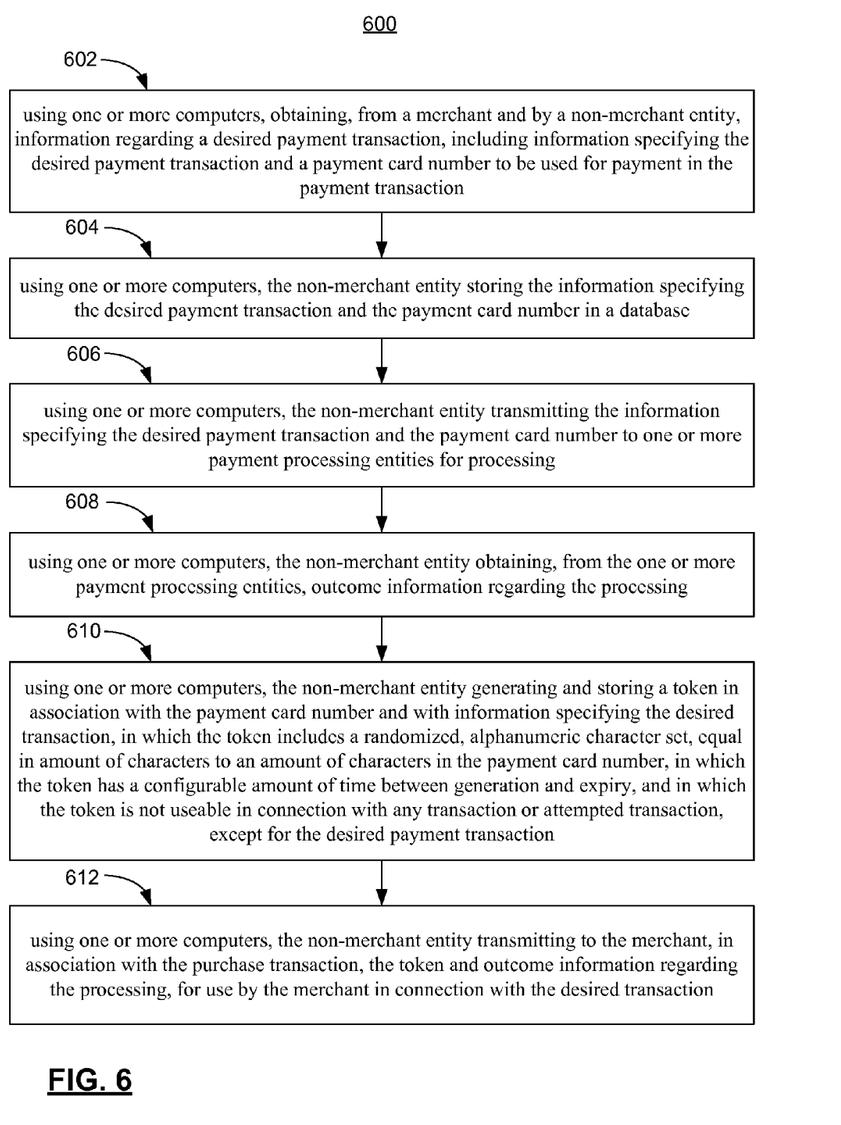
FIG. 6 is a flow diagram illustrating a method according to one embodiment of the invention.

FIG. 6 is a flow diagram 600 illustrating a method according to one embodiment of the invention. Step 602 includes, using one or more computers, obtaining, from a merchant and by a non-merchant entity, information regarding a desired payment transaction, including information specifying the desired payment transaction and a payment card number to be used for payment in the payment transaction. It is noted that "non-merchant entity", as used herein, means an entity who is not a merchant with regard to a particular transaction, such as, here, the desired payment transaction, even if the entity is or may be a merchant in other regards.

Step 604 includes, using one or more computers, the non-merchant entity storing the information specifying the desired payment transaction and the payment card number in a database.

Step 606 includes, using one or more computers, the non-merchant entity transmitting the information specifying the desired payment transaction and the payment card number to one or more payment processing entities for processing.

Step 608 includes, using one or more computers, the non-merchant entity obtaining, from the one or more payment processing entities, outcome information regarding the processing.

Step 610 includes, using one or more computers, the non-merchant entity generating and storing a token in association with the payment card number and with information specifying the desired transaction. The token includes a randomized, alphanumeric character set, equal in amount of characters to an amount of characters in the payment card number. The token has a configurable amount of time between generation and expiry. The token is not useable in connection with any transaction or attempted transaction, except for the desired payment transaction.

Step 612 includes, using one or more computers, the non-merchant entity transmitting to the merchant, in association with the purchase transaction, the token and outcome information regarding the payment processing, for use by the merchant in connection with the desired transaction.

Figure 7:
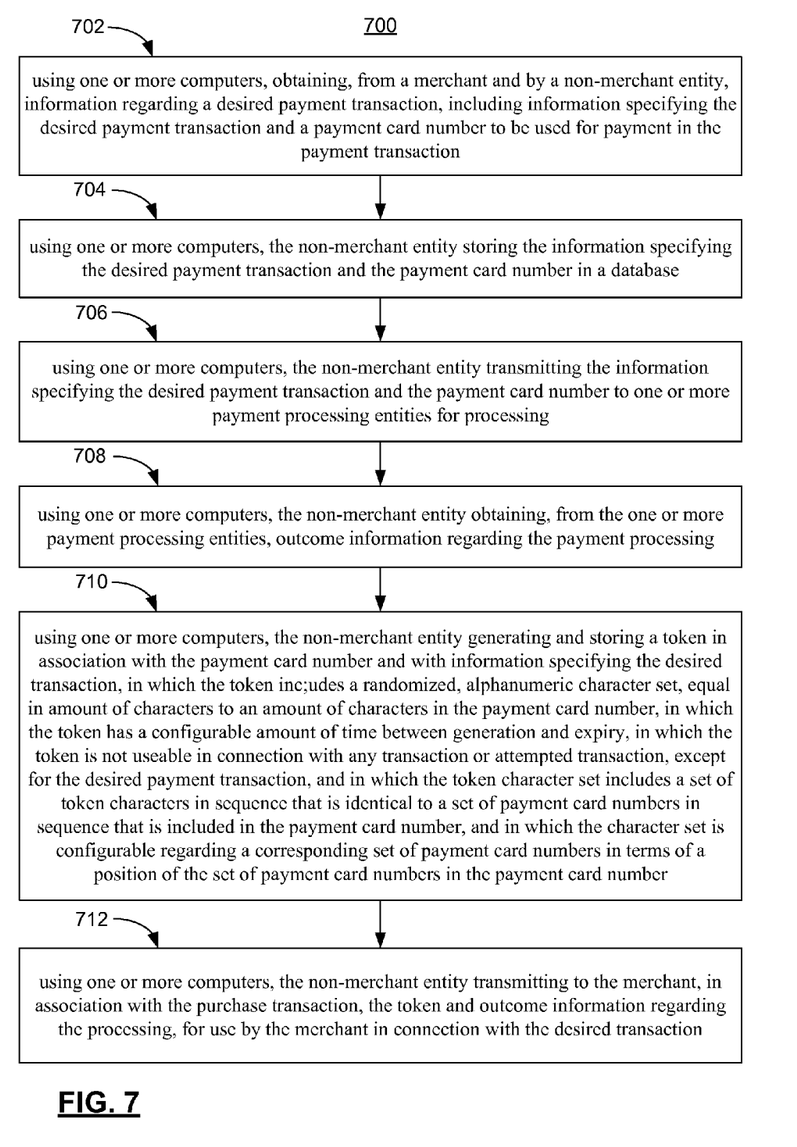
FIG. 7 is a flow diagram illustrating a method according to one embodiment of the invention.

FIG. 7 is a flow diagram 700 illustrating a method according to one embodiment of the invention. Steps 702-708 and 712 are similar to steps 602-608 and 612 as depicted in the method 600 of FIG. 6.

In some embodiments, a tokenization entity (which can broadly include any entity that provides, or is involved in providing, tokens) may receive information including a credit card number from a merchant (where a merchant can broadly include, among other entities, buyers, sellers, retailers, wholesalers, etc., including cooperating entities who together or partially engage in such, and whether in connection with goods, services, items, content, etc.) who may have received it, for example, from a customer attempting to make an online purchase on a Web site of or associated in whole or in part with the merchant, for example. The merchant may not need to store, or store and keep, the credit card number (and possibly other credit card information or other PII), but may instead immediately pass it on (for example, securely, using encryption or other techniques, etc.) to the tokenization entity (as may be a non-merchant entity with regard to a particular transaction), who may store it. In other embodiments, the merchant may not even receive the credit card information, such as if the tokenization entity, or an associated entity, directly receives information entered by a customer of the merchant, whether or not visible to the customer.

The tokenization entity may, for example, store (such as in a tokenization database) the credit card number (as well as possibly other credit card information), associated with a particular requested transaction, such as a transaction requested by the merchant, the customer, or both. Furthermore, the tokenization entity may generate and store a token in association with the credit card information and the requested transaction information, as described herein. The token may then be provided to the merchant for use in pace of the actual credit card number in connection with the requested transaction (which may at some point be a declined or otherwise non-implemented transaction, or an implemented or otherwise completed transaction, such as a purchase). Furthermore, in some embodiments, the tokenization entity may provide, or make available, the credit card information and transaction information (which can include customer information, purchase item information, and other information, etc), to an entity or entities that processes the transaction, such as a bank or other payment processor. The bank may then pass on the requested transaction outcome information to the tokenization entity, who may then pass it on to the merchant, but along with the token and not actual credit card information.

The tokenization entity may then be the party subject to PCC DSS or other requirements or liabilities, risk of liability relating to theft or hacking, etc.

In some embodiments, the merchant may store the token in connection with the requested transaction, and may utilize the token (which may include portions of the credit card number sequence for help in conformations with the customer, for example) for purposes that may include communications with the customer in connection with the requested transaction. For example, the merchant may communicate with the customer with reference to the token, or the included credit card digits, among other information. This can include electronic communications with the customer including Web page information, emails, etc., as well as phone calls, chat, or other live or online communications, etc.

In some embodiments, as described in detail herein, a token may have a set or configurable shelf life, and be useable for only one transaction or requested transaction, or one use by the tokenization entity. Furthermore, the token may be randomized, include alphanumeric characters, and be of the same length as the payment card number, and may be useable in argument fields of APIs and various software and systems in similar or identical ways as a payment card number, without or with limited system modifications, for example. In some embodiments, configurations of parameters can take place prior to generation or at other times, and at various levels of breadth, generality, application, etc. Configuration may include preferential flagging, modification of default settings, etc.

These various parameters, and configurability thereof, can add, for example, flexibility, security, customization, efficiency, convenience, or optimization of token usage by various entities, under various circumstances, for various applications, or for various desired effects, or for a desired balancing between priorities, interests, or advantages and disadvantages, among other things.

While the invention is described with reference to the above drawings, the drawings are intended to be illustrative, and the invention contemplates other embodiments within the spirit of the invention.

The invention claimed is:

1. A method comprising:
    using one or more computers, obtaining, from a merchant and by a non-merchant entity, information regarding a desired payment transaction, including information specifying the desired payment transaction and a payment card number to be used for payment in the payment transaction;
    using one or more computers, the non-merchant entity storing the information specifying the desired payment transaction and the payment card number in a database;
    using one or more computers, the non-merchant entity transmitting the information specifying the desired payment transaction and the payment card number to one or more payment processing entities for processing;
    using one or more computers, the non-merchant entity obtaining, from the one or more payment processing entities, outcome information regarding the processing;
    using one or more computers, the non-merchant entity generating and storing a token in association with the payment card number and with information specifying the desired transaction,
        wherein the token comprises a randomized, alphanumeric character set, equal in amount of characters to an amount of characters in the payment card number,
        wherein the token has a configurable amount of time between generation and expiry, and
        wherein the token is not useable in connection with any transaction or attempted transaction, except for the desired payment transaction; and
    using one or more computers, the non-merchant entity transmitting to the merchant, in association with the purchase transaction, the token and outcome information regarding the processing, for use by the merchant in connection with the desired transaction.

2. The method of claim 1, comprising generating the token, wherein the token character set comprises a set of token characters in sequence that is identical to a set of payment card numbers in sequence that is included in the payment card number.

3. The method of claim 1, comprising generating the token, wherein the token character set comprises a set of token characters in sequence that is identical to a set of payment card number numbers in sequence that is included in the payment card number, and wherein the character set is configurable by the non-merchant entity regarding a corresponding set of payment card numbers in terms of a position of the set of payment card numbers in the payment card number.

4. The method of claim 1, comprising generating the token, wherein the token character set comprises a set of token characters in sequence that is identical to a set of payment card number numbers in sequence that is included in the payment card number, and wherein the character set is configurable by the merchant entity regarding a corresponding set of payment card numbers in terms of a position of the set of payment card numbers in the payment card number.

5. The method of claim 1, comprising generating the token, wherein the token character set comprises a set of token characters in sequence that is identical to a set of payment card number numbers in sequence that is included in the payment card number, and wherein the set of payment card numbers is a last four numbers in the payment card number.

6. The method of claim 1, comprising the non-merchant entity obtaining the payment card number, wherein the payment card number is a credit card number.

7. The method of claim 1, comprising the non-merchant entity obtaining the outcome information, wherein an outcome can include authorization or denial of the payment transaction.

8. The method of claim 1, comprising the non-merchant entity obtaining the outcome information, wherein an outcome can include completion of the payment transaction or non-completion of the payment transaction.

9. The method of claim 1, comprising obtaining the payment card number, wherein the payment card number is of a payment card belonging to a customer of the merchant, and wherein the desired payment transaction is a desired purchase by the customer of a product or service of the merchant.

10. The method of claim 1, comprising obtaining the payment card number, wherein the payment card number is of a payment card belonging to a customer of the merchant, and wherein the desired payment transaction is a desired purchase by the customer of a product or service of the merchant, and wherein the payment card number is input by the customer while the customer is visiting a Web site of the merchant.

11. The method of claim 1, wherein the merchant transmits the payment card number to the non-merchant entity, and wherein the merchant does not store the payment card number in a database, and wherein the merchant stores the token in a database of the merchant for use at least in connection with communications with a customer regarding the desired transaction.

12. The method of claim 1, wherein operations of the non-merchant entity in connection with the desired payment transaction, including storage of information in the database, are Payment Card Industry Data Security Standard compliant.

13. The method of claim 1, comprising generating the token, wherein the configurable amount of time between generation and expiry is configurable by the merchant.

14. The method of claim 1, comprising generating the token, wherein the configurable amount of time between generation and expiry is configurable by the non-merchant entity.

15. The method of claim 1, wherein the token is useable for only one use by the non-merchant entity.

16. The method of claim 1, wherein the token is useable for only one requested transaction.

17. A system comprising:
    one or more server computers coupled to a network; and
    one or more databases coupled to the one or more server computers;
    for the one or more server computers comprising one or more processors; and
    one or more memory devices comprising processor executable instructions which when executed by the one or more processors cause the one or more processors to perform the steps of:
    obtaining, from a merchant and by a non-merchant entity, information regarding a desired payment transaction, including information specifying the desired payment transaction and a payment card number to be used for payment in the payment transaction;

the non-merchant entity storing the information specifying the desired payment transaction and the payment card number in a database of the one or more databases;

the non-merchant entity transmitting the information specifying the desired payment transaction and the payment card number to one or more payment processing entities for processing;

the non-merchant entity obtaining, from the one or more payment processing entities, outcome information regarding the processing;

the non-merchant entity generating and storing a token in association with the payment card number and with information specifying the desired transaction, wherein the token comprises a randomized, alphanumeric character set, equal in amount of characters to an amount of characters in the payment card number, wherein the token has a configurable amount of time between generation and expiry, and wherein the token is not useable in connection with any transaction or attempted transaction, except for the desired payment transaction; and the non-merchant entity transmitting to the merchant, in association with the purchase transaction, the token and outcome information regarding the processing, for use by the merchant in connection with the desired transaction.

18. The system of claim 17, wherein the token character set comprises a set of token characters in sequence that is identical to a set of payment card numbers in sequence that is included in the payment card number, and wherein the character set is configurable regarding a corresponding set of payment card numbers in terms of a position of the set of payment card numbers in the payment card number.

19. The system of claim 17, wherein at least one of the one or more server computers is coupled to the Internet.

20. A non-transitory computer readable medium or media containing instructions for executing a method comprising:

using one or more computers, obtaining, from a merchant and by a non-merchant entity, information regarding a desired payment transaction, including information specifying the desired payment transaction and a payment card number to be used for payment in the payment transaction;

using one or more computers, the non-merchant entity storing the information specifying the desired payment transaction and the payment card number in a database;

using one or more computers, the non-merchant entity transmitting the information specifying the desired payment transaction and the payment card number to one or more payment processing entities for processing;

using one or more computers, the non-merchant entity obtaining, from the one or more payment processing entities, outcome information regarding the processing;

using one or more computers, the non-merchant entity generating and storing a token in association with the payment card number and with information specifying the desired transaction, wherein the token comprises a randomized, alphanumeric character set, equal in amount of characters to an amount of characters in the payment card number, wherein the token has a configurable amount of time between generation and expiry, wherein the token is not useable in connection with any transaction or attempted transaction, except for the desired payment transaction, and wherein the token character set comprises a set of token characters in sequence that is identical to a set of payment card number numbers in sequence that is included in the payment card number, and wherein the character set is configurable regarding a corresponding set of payment card numbers in terms of a position of the set of payment card numbers in the payment card number; and using one or more computers, the non-merchant entity transmitting to the merchant, in association with the purchase transaction, the token and outcome information regarding the processing, for use by the merchant in connection with the desired transaction.

\* \* \* \* \*